(12) United States Patent
Dinamani et al.

(10) Patent No.: US 8,463,676 B1
(45) Date of Patent: Jun. 11, 2013

(54) INTERPRETING REFUND DISCREPANCIES

(75) Inventors: Vidya Dinamani, San Diego, CA (US); Alan Tifford, San Diego, CA (US); Richard N. Preece, San Diego, CA (US); David D. Taylor, San Marcos, CA (US)

(73) Assignee: Intuit Inc., Mountain View, CA (US)

( * ) Notice: Subject to any disclaimer, the term of this patent is extended or adjusted under 35 U.S.C. 154(b) by 119 days.

(21) Appl. No.: 12/846,723

(22) Filed: Jul. 29, 2010

(51) Int. Cl.
*G06Q 40/00* (2012.01)

(52) U.S. Cl.
USPC .................... 705/35; 705/31; 705/36; 705/38; 705/44

(58) Field of Classification Search
USPC ...................................................... 705/15–45
See application file for complete search history.

(56) References Cited

U.S. PATENT DOCUMENTS

| | | | | |
|---|---|---|---|---|
| 2003/0191710 A1* | 10/2003 | Green et al. | ................... | 705/40 |
| 2003/0233296 A1* | 12/2003 | Wagner | ........................... | 705/31 |
| 2008/0082431 A1* | 4/2008 | Bekker | ........................... | 705/31 |

OTHER PUBLICATIONS

"Torts, tax reporting, and preemption: Is there tort liability for incorrect information reports?", Jacob L. Todres, Journal of Corporation Law, v28n2, pp. 259-287, University of Iowa, College of Law, winter 2003.*

* cited by examiner

*Primary Examiner* — Hai Tran
(74) *Attorney, Agent, or Firm* — Osha Liang LLP

(57) ABSTRACT

In general, in one aspect, the invention relates to a method, system, and computer readable medium for interpreting discrepancy codes. The invention comprises obtaining, by an intermediary system, tax information associated with a taxpayer, wherein the tax information comprises an expected refund amount; obtaining an issued refund amount associated with the taxpayer; comparing the expected refund amount and the issued refund amount; determining, based on the comparing, a discrepancy amount; obtaining, in response to determining the discrepancy amount, a discrepancy code associated with the issued refund amount; retrieving, from a discrepancy code database, a discrepancy information record using the discrepancy code, wherein the discrepancy information record indicates a source of the discrepancy amount; generating a discrepancy explanation using the discrepancy information record, the discrepancy amount, and the tax information; and sending the generated discrepancy explanation to a client system.

25 Claims, 14 Drawing Sheets

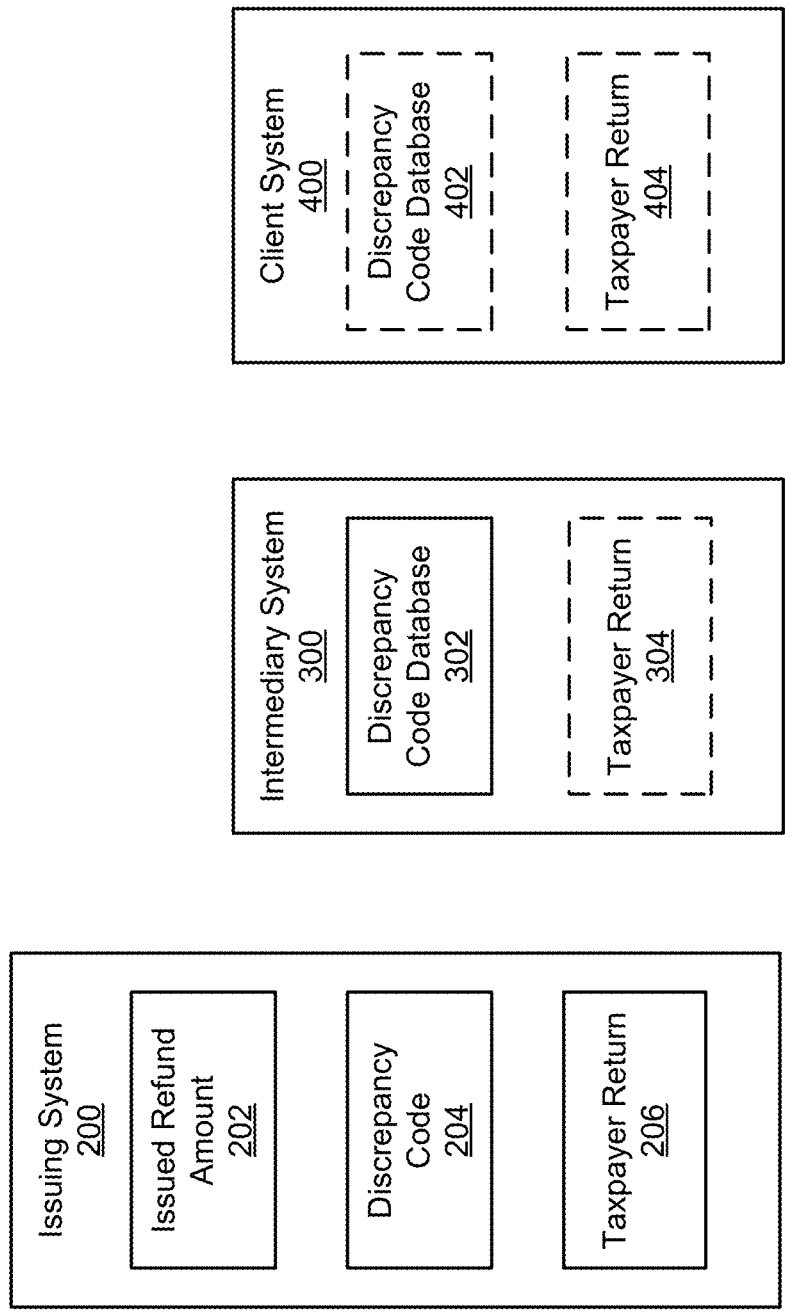

INTERPRETING REFUND DISCREPANCIES

BACKGROUND

In many modern tax systems, certain taxes are withheld from a taxpayer's paycheck to satisfy the tax obligations of the taxpayer. Frequently, the amount withheld over a certain period will exceed the amount owed by the taxpayer. The taxpayer is often given an opportunity to claim a refund from the taxing authority. In filing the necessary documents to claim a tax refund, the taxpayer may submit the amount which the taxpayer believes was overpaid. The issuing authority may or may not distribute a refund equal to the amount submitted by the taxpayer. In certain cases, the taxpayer may receive a refund that differs from the taxpayer's expectations. In such cases, the taxpayer may be unable to determine the source of the discrepancy.

SUMMARY

In general, in one aspect, the invention relates to a method for interpreting discrepancy codes. The method includes obtaining, by an intermediary system, tax information associated with a taxpayer, wherein the tax information comprises an expected refund amount. The method further includes obtaining an issued refund amount associated with the taxpayer, and comparing the expected refund amount and the issued refund amount. The method further includes determining, based on the comparing, a discrepancy amount, and obtaining, in response to determining the discrepancy amount, a discrepancy code associated with the issued refund amount. The method further includes retrieving, from a discrepancy code database, a discrepancy information record using the discrepancy code, wherein the discrepancy information record indicates a source of the discrepancy amount, generating a discrepancy explanation using the discrepancy information record, the discrepancy amount, and the tax information, and sending the generated discrepancy explanation to a client system.

In general, in one aspect, the invention relates to a method for interpreting discrepancy codes. The method includes obtaining, by a client system, an issued refund amount and a discrepancy code from an issuing system, wherein the issued refund amount is associated with a taxpayer, comparing, by the client system, the issued refund amount and an expected refund amount, wherein the expected refund amount is determined using a tax return associated with the taxpayer, and determining, based on the comparing, a discrepancy amount. The method further includes retrieving, from a discrepancy code database based on the determination, a discrepancy information record using the discrepancy code, wherein the discrepancy information record indicates a source of the discrepancy amount, and generating a discrepancy explanation using the discrepancy information record, the discrepancy amount, and the tax information.

In general, in one aspect, the invention relates to computer readable storage medium comprising software instructions, which when executed by a processor, perform a method. The method includes obtaining, by an intermediary system, tax information associated with a taxpayer, wherein the tax information comprises an expected refund amount. The method further includes obtaining an issued refund amount associated with the taxpayer, and comparing the expected refund amount and the issued refund amount. The method further includes determining, based on the comparing, a discrepancy amount, and obtaining, in response to determining the discrepancy amount, a discrepancy code associated with the issued refund amount. The method further includes retrieving, from a discrepancy code database, a discrepancy information record using the discrepancy code, wherein the discrepancy information record indicates a source of the discrepancy amount, generating a discrepancy explanation using the discrepancy information record, the discrepancy amount, and the tax information, and sending the generated discrepancy explanation to a client system.

In general, in one aspect, the invention relates to computer readable storage medium comprising software instructions, which when executed by a processor, perform a method. The method includes obtaining, by a client system, an issued refund amount and a discrepancy code from an issuing system, wherein the issued refund amount is associated with a taxpayer, comparing, by the client system, the issued refund amount and an expected refund amount, wherein the expected refund amount is determined using a tax return associated with the taxpayer, and determining, based on the comparing, a discrepancy amount. The method further includes retrieving, from a discrepancy code database based on the determination, a discrepancy information record using the discrepancy code, wherein the discrepancy information record indicates a source of the discrepancy amount, and generating a discrepancy explanation using the discrepancy information record, the discrepancy amount, and the tax information.

In general, in one aspect, the invention relates to system comprising an issuing system, an intermediary system, and an application executing on a processor. The issuing system includes an issued refund amount associated with a taxpayer, and a discrepancy code associated with the issued refund amount. The intermediary system includes a discrepancy code database, and a tax return associated with the taxpayer, wherein the tax return comprises an expected refund amount. The application is configured to retrieve, from the issuing system, the issued refund amount, and compare the expected refund amount and the issued refund amount. The application is further configured to determine, based on the comparing, a discrepancy amount, and obtain, in response to determining the discrepancy amount, the discrepancy code. The application is further configured to retrieve, from the discrepancy code database, a discrepancy information record using the discrepancy code, wherein the discrepancy information record indicates a source of the discrepancy amount, generate a discrepancy explanation using the discrepancy information record, the discrepancy amount, and the tax return, and send the generated discrepancy explanation to a client system.

BRIEF DESCRIPTION OF DRAWINGS

FIG. 2 shows an issuing system in accordance with one or more embodiments of the invention.

FIG. 3 shows an intermediary system in accordance with one or more embodiments of the invention.

FIG. 4 shows a client system in accordance with one or more embodiments of the invention.

DETAILED DESCRIPTION

Figure 1A:
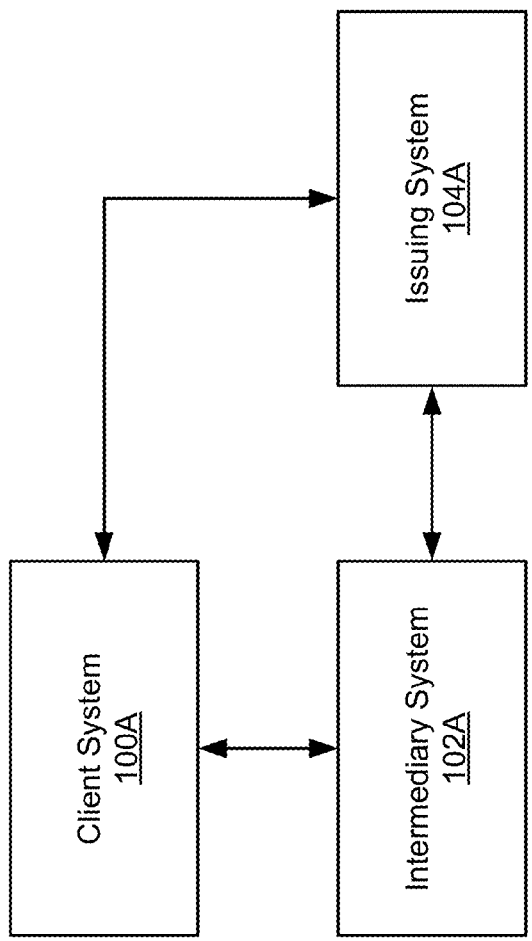
FIGS. 1A-1B show diagrams of the system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for interpreting refund discrepancies. Specifically, embodiments of the invention may be used to obtain information about a discrepancy between an expected tax refund and the amount actually refunded to the taxpayer.

FIG. 1A shows a diagram of a system in accordance with one or more embodiments of the invention. As shown in FIG. 1A, the system includes a client system (100A), an intermediary system (102A), and an issuing system (104A). In one or more embodiments of the invention, the client system (100A), is a computer system operated by a taxpayer (also referred to as the user or client). A taxpayer may correspond to an individual, a business entity, an agent of the business entity, or any other taxpaying entity. In one or more embodiments of the invention, the client system (100A) is an application executing on a computer system operated by a taxpayer.

In one or more embodiments of the invention, the intermediary system (102A) corresponds to a computer system operated by a tax preparer. In one or more embodiments of the invention, the intermediary system (102A) is an application executing on a computer system under the control of an intermediary entity (e.g., a tax preparer) (not shown). Further, in one or more embodiments of the invention, the intermediary system is a component of a tax preparation software product. A tax preparation software product may be a group of applications used by a taxpayer or tax preparer to compile tax information and generate a tax return and other tax-related documents for submission to a tax authority. In one or more embodiments of the invention, a single computer system hosts both the intermediary system (102A) and the client system (100A).

In one or more embodiments of the invention, the issuing system (104A) corresponds to a computer system operated by an issuing authority (not shown). In one or more embodiments of the invention, the issuing authority corresponds to the Internal Revenue Service (IRS). In one or more embodiments of the invention, the issuing authority may correspond to an entity responsible for collecting taxes from taxpayers or to an entity responsible for dispensing refunds to taxpayers from whom more taxes were collected than owed.

In one or more embodiments of the invention, the client system (100A), intermediary system (102A), and the issuing system (104A) may each provide an interface through which other systems may request information related to a taxpayer. This interface may include an internet application hosted on a web server, and may be accessible via an internet browser executing on the local system. In one or more embodiments of the invention, the interface may include another application utilizing a network protocol compatible with the system receiving the request.

Figure 1B:
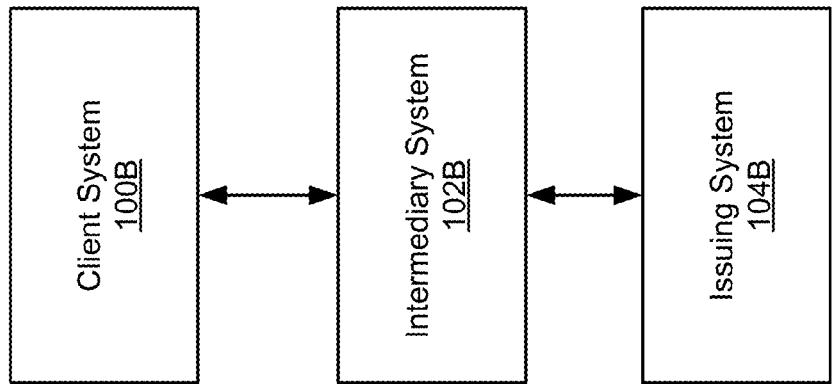

FIG. 1B shows a diagram of a system in accordance with one or more embodiments of the invention. The client system (100B), intermediary system (102B), and the issuing system (104B) depicted in FIG. 1B are substantially similar to the elements as described with regard to FIG. 1A. In one or more embodiments of the invention, and as depicted in FIG. 1B, the client system (100B) and the issuing system (104B) communicate indirectly via the intermediary system (102B).

FIG. 2 shows a diagram of an issuing system in accordance with one or more embodiments of the invention. As shown in FIG. 2, the issuing system (200) includes an issued refund amount (202), a discrepancy code (204), and a taxpayer return (206) (described further in FIG. 5). Each of these components is described below.

In one or more embodiments of the invention, the issued refund amount (202) is the dollar value of a tax refund owed to a taxpayer, and calculated by an issuing authority (not shown). The tax refund may, for example, be associated with federal or state income tax filings by the taxpayer.

In one or more embodiments of the invention, the discrepancy code (204) is an identifier associated with the issued refund amount (202) which represents the source or sources of a discrepancy between the refund amount requested by the taxpayer and the issued refund amount (202).

In one or more embodiments of the invention, the discrepancy code may include numerical or alphabetical characters, or a combination of both numerical and alphabetical characters. The discrepancy code may be made up of non-alphanumeric characters, such as pictograms. The discrepancy code may include symbols used in conjunction with a scanning interpreter such as a one-dimensional or two-dimensional barcode. Further, the discrepancy code (204) may include two or more sections, each indicating a different level of specificity. For example, a first section of the discrepancy code may be associated with a discrepancy type (e.g., garnishment, return entry error), a second section of the discrepancy code (204) may be associated with a source (e.g., unpaid federal income taxes, line number of return entry), and a third section may be associated with other details (e.g., year of unpaid taxes, amount unpaid, corrected return entry value, etc).

FIG. 3 shows a diagram of an intermediary system in accordance with one or more embodiments of the invention. As shown in FIG. 3, the intermediary system (300) includes a discrepancy code database (302) (described further in FIG. 7). In one or more embodiments of the invention, the intermediary system may also include a taxpayer return (303) (described further in FIG. 5).

FIG. 4 shows a diagram of a client system in accordance with one or more embodiments of the invention. As shown in FIG. 4, the client system (400) may include a discrepancy code database (402) (described further in FIG. 7) and a taxpayer return (404) (described further in FIG. 5).

Figure 5:
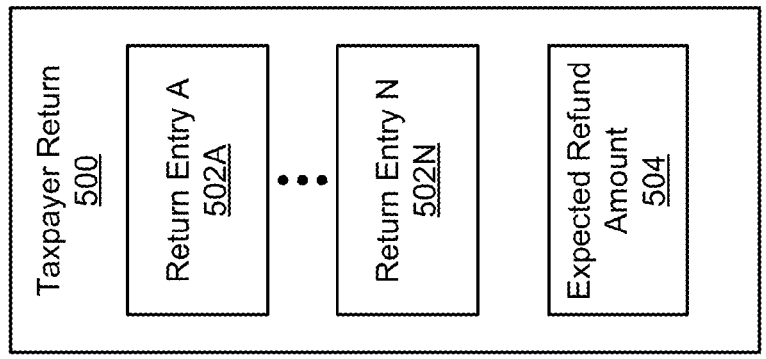
FIG. 5 shows a client return in accordance with one or more embodiments of the invention.

FIG. 5 shows a diagram of a taxpayer return in accordance with one or more embodiments of the invention. As shown in FIG. 5, the taxpayer return (500) includes a one or more return entries (e.g., return entry A (502A) return entry N (502N)) and an expected refund amount (504).

In one or more embodiments of the invention, a taxpayer return is a document or set of documents filed by a taxpayer which have the effect of requesting a refund from an issuing authority for taxes paid in excess of the amount of taxes owed. This may correspond to a federal income tax return or a state income tax return. In one or more embodiments of the invention, a taxpayer return is a determination of the taxes owed calculated by the taxpayer. In one or more embodiments of the invention, the taxpayer calculates the taxes owed by declaring a taxable sum of money, and claiming deductions which the taxpayer believes are applicable. In one or more embodiments of the invention, the taxpayer return may be generated and prepared by a tax preparer working on the taxpayer's behalf (e.g., an accountant hired by the taxpayer, a service provided by a financial institution, etc.).

In one or more embodiments of the invention, each return entry (e.g., return entry A (502A) return entry N (502N)) corresponds to an entry value entered by a taxpayer in the taxpayer return (500). Examples of return entries (e.g., return entry A (502A) return entry N (502N)) may include the number of dependents, amount of depreciation of an asset, income from rental property, etc.

In one or more embodiments of the invention, the expected refund amount (504) is a dollar value of a tax refund owed to a taxpayer, and calculated by the taxpayer or a tax return preparer. The expected refund amount may be calculated using the return entries (e.g., return entry A (502A) return entry N (502N)) and the instructions provided by the issuing authority (not shown). For example, in an income tax context, an issuing authority may instruct the taxpayer to subtract all deductions (e.g., return entry A (502A)) from all income (e.g., return entry N (502N)) to determine the expected refund amount (504) owed to the taxpayer.

Figure 6:
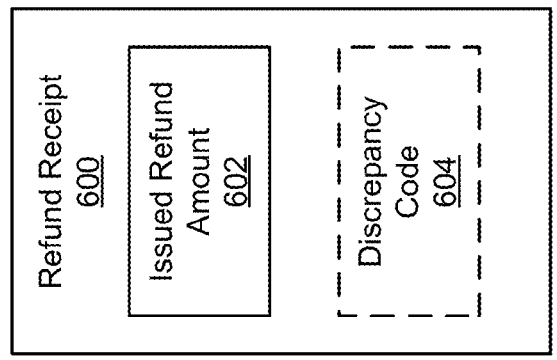
FIG. 6 shows a refund receipt in accordance with one or more embodiments of the invention.

FIG. 6 shows a diagram of a refund receipt in accordance with one or more embodiments of the invention. As shown in FIG. 6, the refund receipt (600) includes an issued refund amount (602) (substantially similar to the issued refund amount described in FIG. 2). In one or more embodiments of the invention, the refund receipt may include a discrepancy code (604) (substantially similar to the discrepancy code described in FIG. 2).

In one or more embodiments of the invention, the refund receipt (600) is obtained from the issuing authority concurrently with the issued refund (i.e., the funds transferred from the issuing authority to the taxpayer as the refund) (not shown). In one or more embodiments of the invention, the refund receipt is obtained prior to receiving the funds from the issuing authority. The refund receipt may be obtained using an issuing system interface as described in reference to FIG. 1. In one or more embodiments of the invention, the refund receipt includes an issued refund amount (602). In one or more embodiments of the invention, the issued refund amount (602) is identical to the issued refund amount in the issuing system (issued refund amount (202) in FIG. 2). In one or more embodiments of the invention, the return receipt also includes a discrepancy code (604). In one or more embodiments of the invention, the discrepancy code (604) is identical to the discrepancy code in the issuing system (discrepancy code (204) in FIG. 2).

Figure 7:
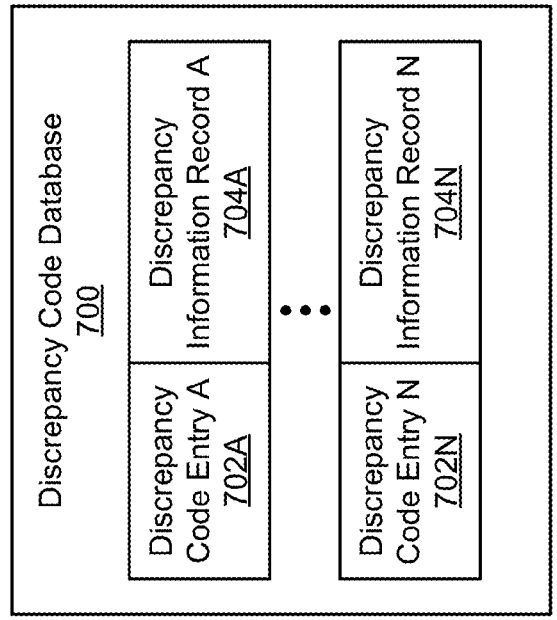
FIG. 7 shows a discrepancy code database in accordance with one or more embodiments of the invention.

FIG. 7 shows a diagram of a discrepancy code database in accordance with one or more embodiments of the invention. As shown in FIG. 7, the discrepancy code database (700) includes one or more discrepancy code entries (e.g., discrepancy code entry A (702A), discrepancy code entry N (702N)). Each discrepancy code entry (e.g., discrepancy code entry A (702A), discrepancy code entry N (702N)) in the discrepancy code database (700) is associated with a discrepancy information record (e.g., discrepancy information record A (704A), discrepancy information record N (704N)).

In one or more embodiments of the invention, a discrepancy information record (e.g., discrepancy information record A (704A), discrepancy information record N (704N)) includes a translation, meaning, or interpretation of the provided discrepancy code. The discrepancy information record (e.g., discrepancy information record A (704A), discrepancy information record N (704N)) may also provide a method of interpreting one or more sections of the provided discrepancy code. For example, the discrepancy information record (e.g., discrepancy information record A (704A), discrepancy information record N (704N)) record associated with the discrepancy code "EE-19" may indicate that the discrepancy code section "EE" means that there was a return entry error, and that the "-19" indicates the line number of the return entry error.

In one or more embodiments of the invention, the discrepancy code database (700) provides a mechanism for receiving a query and providing a response to the query. For example, the discrepancy code database (700) may receive a query which includes a discrepancy code that matches one or more discrepancy code entries (e.g., discrepancy code entry A (702)). The discrepancy code database (700) may, in response to the query, provide the discrepancy information record associated with that discrepancy code entry (e.g., discrepancy record A (704A) is associated with discrepancy code entry A (702A)). In one or more embodiments of the invention, this functionality is provided by a mechanism external to the discrepancy code database (700).

In one or more embodiments of the invention, each discrepancy code entry (e.g., discrepancy code entry A (702A), discrepancy code entry N (702N)) may correspond to a section of a discrepancy code. For example, a discrepancy code that includes a first section of alphabetic characters and a second section of numerical characters, may correspond to two different discrepancy code entries. The section of alphabetic characters may be associated with a first discrepancy code entry, and the section of numerical characters may be associated with a second discrepancy code entry. A discrepancy code may include sections which are not associated with a discrepancy code entry, and may be interpreted without querying the discrepancy code database (700) or using instructions from a discrepancy information record associated with a separate discrepancy code entry. (e.g., a year, a garnishment value, the name of a party related to the discrepancy).

Figure 8:
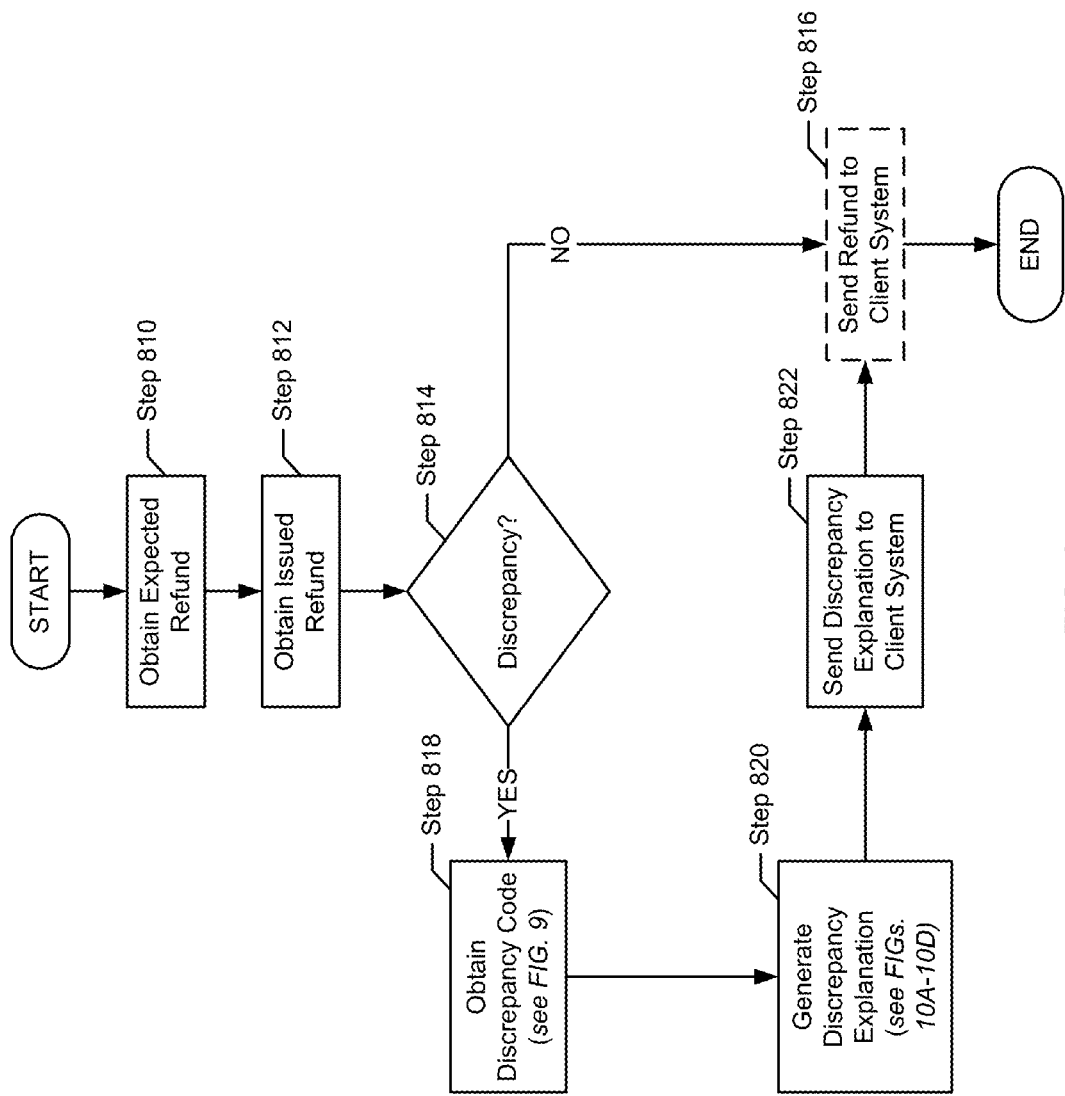
FIGS. 8-10 show flow diagrams in accordance with one or more embodiments of the invention.

FIG. 8 shows a flowchart in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel.

FIG. 8 shows a flowchart for generating a discrepancy explanation in accordance with one or more embodiments of the invention. In Step 810, the intermediary system obtains an expected refund amount associated with a tax return of a taxpayer. In one or more embodiments of the invention, the expected refund amount is obtained by the intermediary system by first obtaining tax information from the taxpayer directly or via a client system. The intermediary system then generates a taxpayer return and calculates the expected refund amount from the tax information. In another embodiment of the invention, the intermediary system receives the expected refund amount from the taxpayer or tax preparing entity.

In Step 812, the intermediary system obtains an issued refund amount associated with the tax return of a taxpayer. The intermediary system may obtain the issued refund amount from the taxpayer, either directly or via a client system. In one or more embodiments of the invention, the intermediary system obtains the issued refund amount from the issuing system. The intermediary system may generate a query to an issuing authority (directly or via an issuing system) requesting the issued refund amount. In one or more embodiments of the invention, the issuing system may respond to the query before the taxpayer receives the refund. The issued refund amount may be sent as part of a refund receipt (as described in FIG. 6) and may include a discrepancy code. In one or more embodiments of the invention, the refund receipt is received by the intermediary system directly or via the client system.

In Step 814, the intermediary system determines whether there is a discrepancy between the expected refund amount and the issued refund amount. In one or more embodiments of the invention, the intermediary system determines that there is no discrepancy when the expected refund amount and the issued refund amount are equal or when the difference is within a pre-determined margin. In one or more embodiments of the invention, a pre-determined margin may be an amount of difference set by the taxpayer or issuing authority that is not significant enough to take action (i.e., attempt to determine the source of the discrepancy). The flow then proceeds to Step 816. Optionally, in Step 816, if the intermediary system received the refund (i.e. monetary distribution of the refund), the refund is transmitted to the client system.

In Step 814, in one or more embodiments of the invention, the intermediary system determines that a discrepancy exists when the expected refund amount and the issued refund amount are unequal or when the difference is outside a pre-determined margin. If a discrepancy is determined to exist, then the intermediary system obtains the discrepancy amount. The discrepancy amount is the difference between the expected refund amount and the issued refund amount.

In Step 818, the intermediary system obtains one or more discrepancy information records. Step 818 is described with greater detail in FIG. 9.

In Step 820, the intermediary system generates a discrepancy explanation. Step 820 is described with greater detail in FIGS. 10A-10D. In Step 822, the discrepancy explanation generated by the intermediary system is sent to the client system. Optionally, the intermediary system may also send the refund (i.e. monetary distribution of the refund) to the client system in Step 816.

Figure 9:
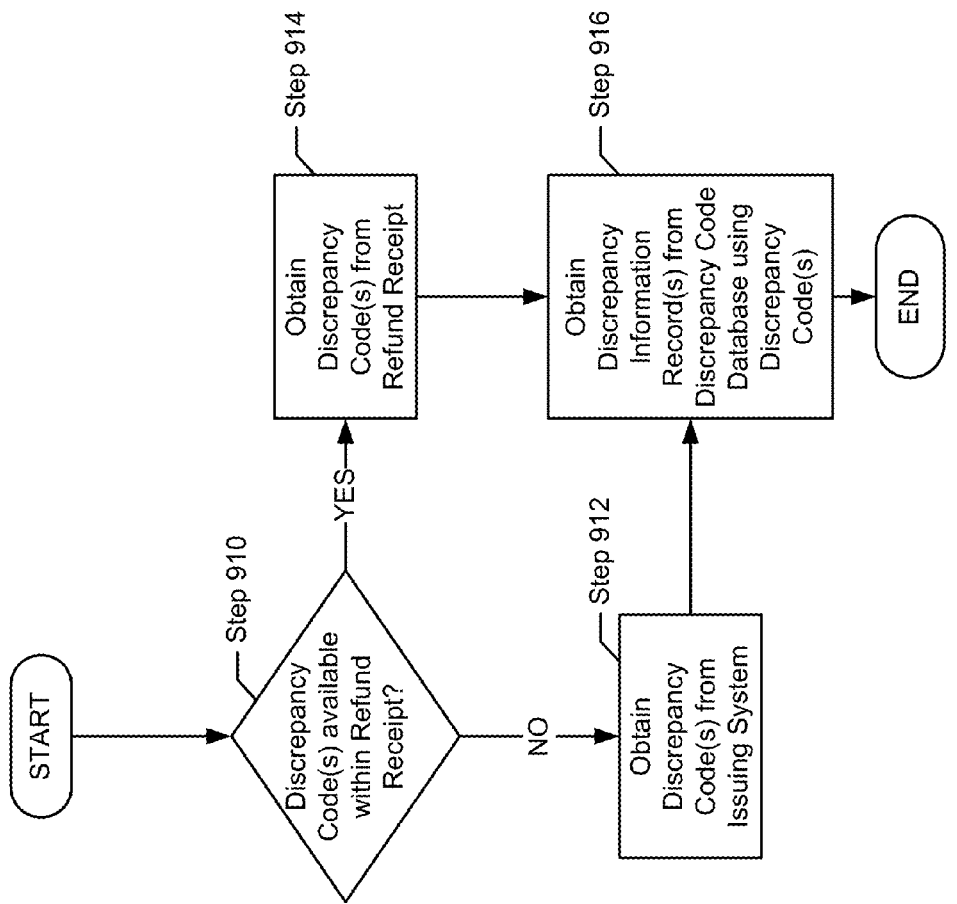

FIG. 9 shows a flowchart in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel.

FIG. 9 shows a detailed flowchart of Step 818 in FIG. 8. Specifically, FIG. 9 shows a flowchart for obtaining one or more discrepancy information records in accordance with one or more embodiments of the invention. In Step 910, in one or more embodiments of the invention, the intermediary system first determines whether one or more discrepancy codes are available in a refund receipt. If no refund receipt is available, or if the refund receipt does not contain a discrepancy code, then in Step 912, the intermediary system contacts the issuing authority to obtain the discrepancy code or codes associated with the taxpayer return. In one or more embodiments of the invention, the intermediary system transmits a query requesting the discrepancy code to the issuing system via an interface.

If one or more discrepancy codes are available in the refund receipt, then in Step 914, the discrepancy codes are retrieved from the refund receipt. In Step 916, the intermediary system obtains the discrepancy information records for each obtained discrepancy code from the discrepancy code database.

Figure 10A:
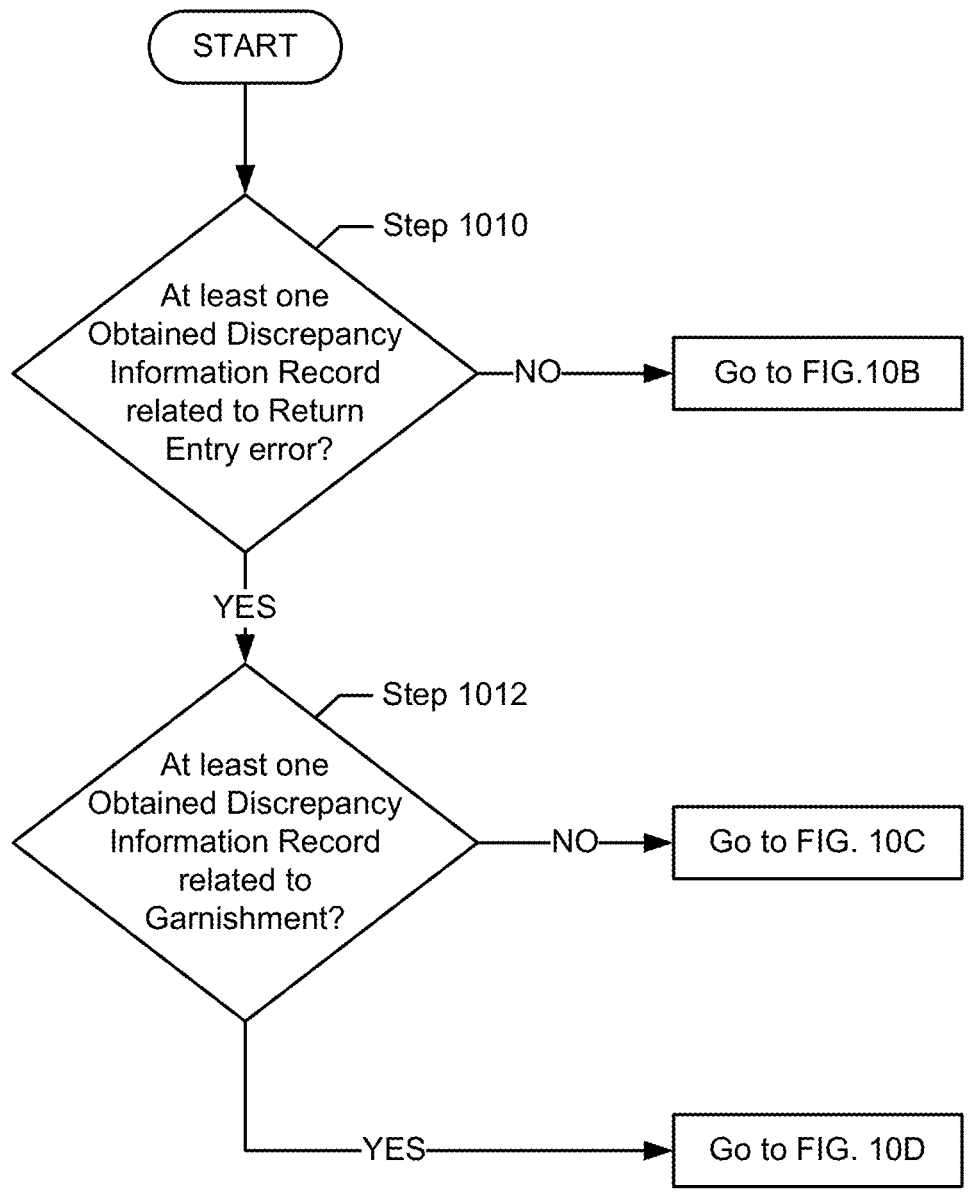

FIG. 10A shows a flowchart in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel.

FIG. 10A shows a detailed flowchart of Step 820 in FIG. 8. Specifically, FIG. 10A shows a flowchart for generating a discrepancy explanation in accordance with one or more embodiments of the invention. In Step 1010, the intermediary system first determines whether at least one of the obtained discrepancy information records relates to an error in one or more return entries of the taxpayer return. If none of the discrepancy information records relate to an error in one or more return entries of the taxpayer return, then the flow continues to FIG. 10B.

In one or more embodiments of the invention, a return entry error is a discrepancy source related to an incorrect or inaccurate return entry value entered in the taxpayer return. Examples of return entry errors may include inconsistent return entry values, miscalculations entered by the taxpayer or tax preparer, and unrecognized or illegible return entry values.

In Step 1012, the intermediary system determines whether at least one of the obtained discrepancy information records is related to a garnishment. In one or more embodiments of the invention, a garnishment is a withholding of all or part of a taxpayer's refund by the issuing authority for reasons distinct from the content of the taxpayer return. Examples of garnishments include unpaid taxes from previous years and compensation for unpaid child support. A garnishment type is the source or reason given by the issuing authority for the garnishment. A garnishment amount is the monetary amount withheld by the issuing authority due to the garnishment.

Figure 10B:
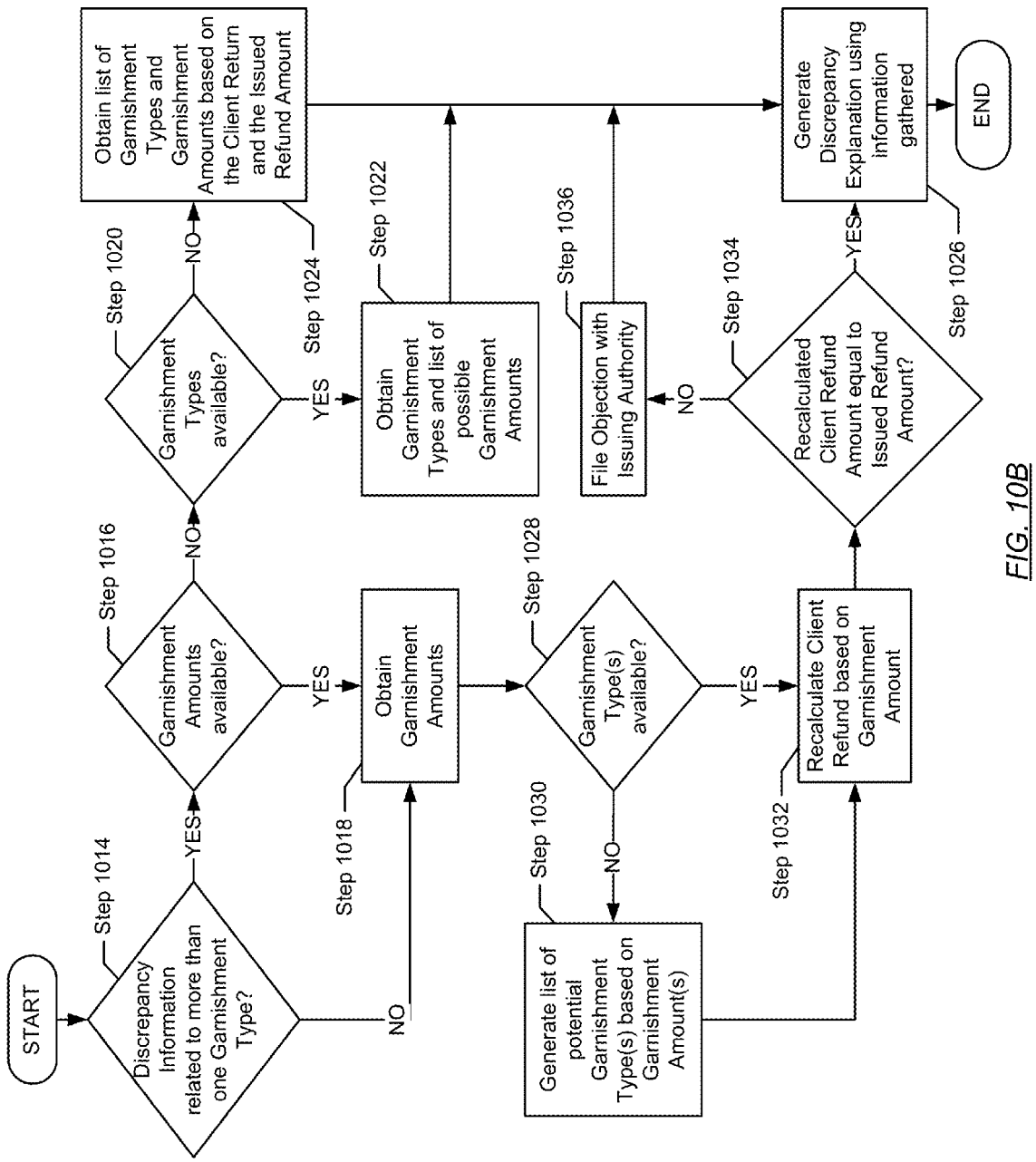
Figure 10C:
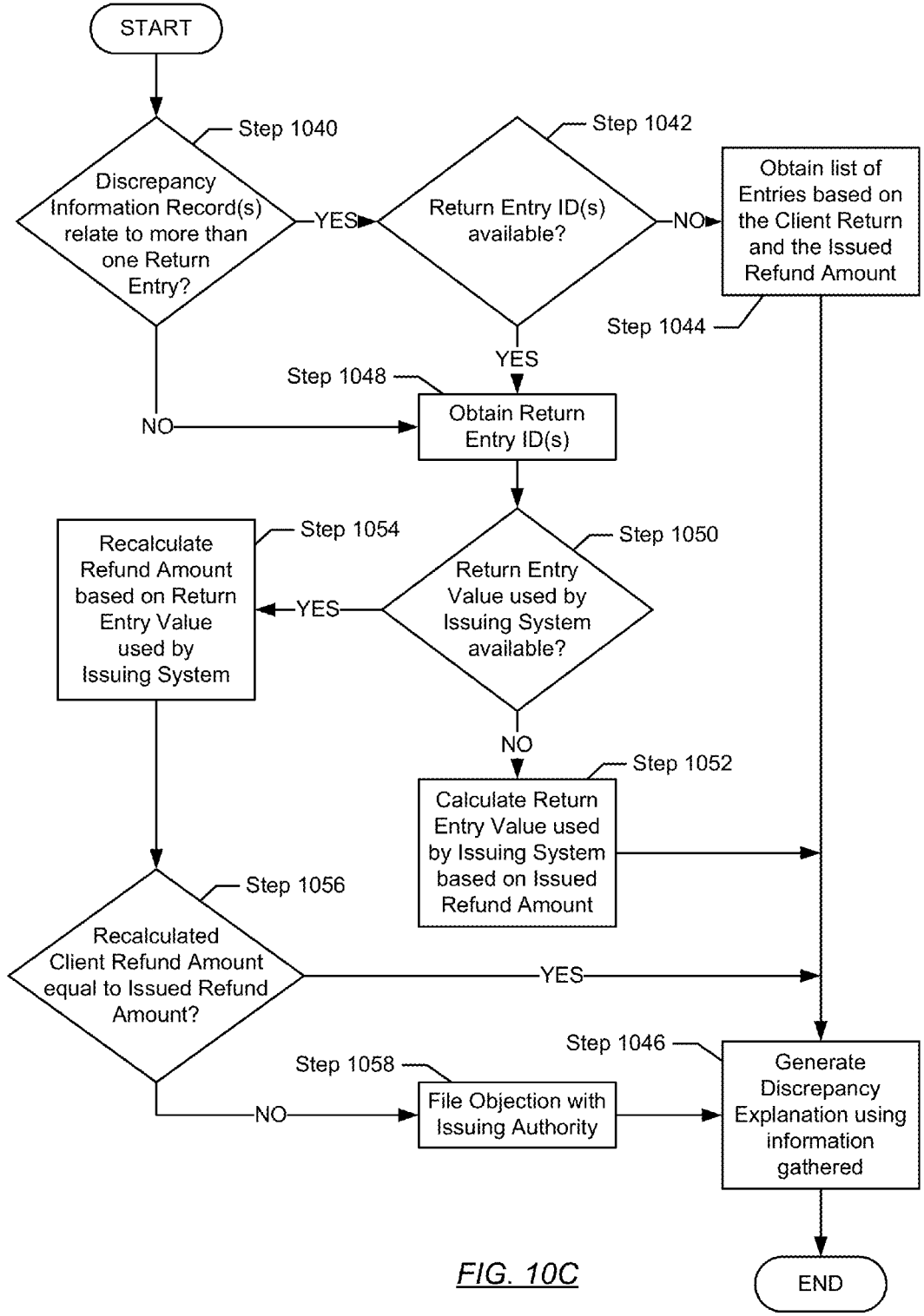

If the intermediary system determines that at least one of the obtained discrepancy information records is related to a garnishment, then the flow continues to FIG. 10C.

Figure 10D:
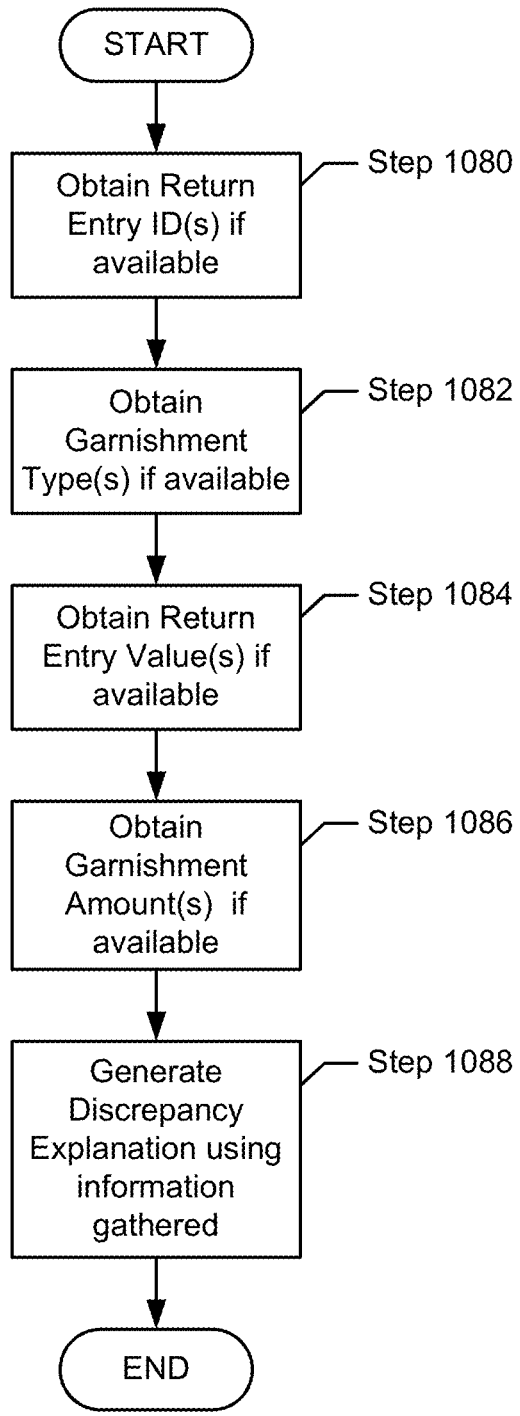

If the intermediary system determines that at least one of the discrepancy information records is related to an error in one or more return entries of the taxpayer return, and that at least one of the discrepancy information records is related to a garnishment, then the flow continues to FIG. 10D.

FIG. 10B shows a flowchart in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel.

FIG. 10B continues from FIG. 10A, and shows the steps taken by the intermediary system if none of the discrepancy information records relate to an error in one or more return entries of the taxpayer return. All of the retrieved discrepancy information records, therefore, relate to garnishments. In Step 1014, the intermediary system determines whether the retrieved discrepancy information records relate to more than one garnishment type. In one or more embodiments of the invention, the garnishment type may be determined using one or more sections of the discrepancy code or the retrieved discrepancy information records.

If the discrepancy information records relate to more than one type of garnishment, then in Step 1016, the intermediary system determines whether the garnishment amounts are available. If in Step 1016, the intermediary system determines that the garnishment amounts are not available, then the intermediary system determines whether the garnishment types are available in Step 1020.

If in Step 1020, the intermediary system determines that the garnishment types are available, then in Step 1022, the intermediary system obtains the garnishment types. In one or more embodiments of the invention, the garnishment types may be determined using one or more sections of the discrepancy code or the retrieved discrepancy information records. In one or more embodiments of the invention, the garnishment types are obtained by generating a query to the issuing authority (directly or via the issuing system) requesting the garnishment types associated with the taxpayer return. In addition, the garnishment type may be determined using information gathered by the intermediary system about the taxpayer together with information about the processes and regulations of the issuing authority. For example, the intermediary system may be aware of past unpaid taxes, and use a comparison between the amount of unpaid taxes and the difference between the expected refund amount and the issued refund amount to determine that the garnishment type relates to unpaid taxes. Once the garnishment types are obtained, the intermediary system may then use that information to determine a possible list of garnishment amounts associated with the discrepancy.

If the garnishment types are not available, then in Step 1024, the intermediary system obtains a list of possible garnishment types and garnishment amounts based on the taxpayer return and the issued refund amount. In one or more embodiments of the invention, the list includes a best estimation of the garnishment types and garnishment amounts applicable to the taxpayer using any other information gathered about the taxpayer. For example, without information about the garnishment type or garnishment amount, the intermediary system may have information suggesting that the taxpayer was out of the country for a number of years, and may suggest that one garnishment type may relate to unpaid taxes due to failure to file a taxpayer return for those years.

In Step 1026, the issuing system uses the information obtained regarding the garnishment amounts and garnishment types and generates a discrepancy explanation. In one or more embodiments of the invention, the discrepancy explanation is a physical or electronic document or set of documents which may provide the associated taxpayer with information related to a discrepancy between the taxpayer's expected refund amount and the issued refund amount. The discrepancy explanation may include the garnishment types obtained, garnishment amounts obtained, sources of the garnishment, reasons for the garnishment, and steps the taxpayer can take to avoid the garnishment in the future.

If in Step 1016, the intermediary system determines that the discrepancy amounts are available, or if in Step 1014, the discrepancy information records relate to one type of garnishment, then in Step 1018, the intermediary system obtains the garnishment amounts. In one or more embodiments of the invention, the garnishment amounts may be determined using one or more sections of the discrepancy code or the retrieved discrepancy information records. In one or more embodiments of the invention, the garnishment amounts are obtained by generating a query to the issuing authority (directly or via the issuing system) requesting the garnishment amounts associated with the taxpayer return. In addition, in one or more embodiments of the invention, the garnishment amounts are obtained using the difference between the expected refund amount and the issued refund amount.

In Step 1028, the intermediary system determines whether the garnishment types are available. As discussed above, the garnishment types may be determined using one or more sections of the discrepancy code or the retrieved discrepancy information records. In one or more embodiments of the invention, the garnishment types are obtained by generating a query to the issuing authority (directly or via the issuing system) requesting the garnishment types associated with the taxpayer return. In addition, the garnishment type may be determined using information gathered by the intermediary system about the taxpayer together with information about the processes and regulations of the issuing authority.

If the garnishment types are not available, then in Step 1030, the intermediary system generates a list of possible garnishment type(s) based on the garnishment amount(s). The list may be generated using the garnishment amount, as well as information about the taxpayer and the taxpayer return obtained by the intermediary system.

Once the garnishment type has been obtained, or a list of possible garnishment types has been generated, then in Step 1032, the intermediary system uses the garnishment amount to recalculate the expected refund amount. In Step 1034, the intermediary system determines whether the recalculated expected refund amount is equal to the issued refund amount. In one or more embodiments of the invention, the expected refund amount is recalculated by the intermediary system to ensure that the issuing authority and the intermediary system possess consistent information.

If the recalculated expected refund and the issued refund amount are not equal or not within a predetermined amount, then in Step 1036, the intermediary system files an objection with the issuing authority. In one or more embodiments of the invention, the objection provides the issuing authority with information related to the inconsistency between the recalculated expected refund amount and the issued refund amount. In one or more embodiments of the invention, the objection is submitted via the issuing system. Alternatively, in one or more embodiments of the invention, the intermediary system notifies the taxpayer prior to submitting the objection. In one or more embodiments of the invention, the intermediary system may request authorization from the taxpayer in order to submit the objection, and may not submit the objection without authorization. In one or more embodiments of the invention, the intermediary system provides instructions enabling the taxpayer to file the objection. In one embodiment of the invention, information associated with the inconsistency obtained in Step 1036 is included in the discrepancy explanation generated in Step 1026.

If the intermediary system determines that the recalculated expected refund amount is equal to the issued refund amount, or within a pre-determined margin, then in Step 1026, the information related to the recalculated expected refund amount is included in the generated discrepancy explanation.

FIG. 10C shows a flowchart in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel.

FIG. 10C continues from FIG. 10A, and shows the steps taken by the intermediary system if at least one of the discrepancy information records relate to an error in one or more return entries of the taxpayer return, and none of the discrepancy information records related to a garnishment. All of the retrieved discrepancy information records, therefore, relate to return entry errors.

In Step 1040, the intermediary system determines whether the retrieved discrepancy information records relate to more than one return entry. In one or more embodiments of the invention, a return entry includes a return entry identifier (ID) and a return entry value. A return entry ID indicates the location or type of the associated return entry, and may include the line number of the return entry. A return value is the value of the return entry used by the issuing authority in calculating the issued refund amount, and may differ from the value within the taxpayer return as filed.

If the discrepancy information records relate to more than one return entry, then in Step 1042, the intermediary system determines whether the return entry IDs are available. The intermediary system determines that the return entry IDs are not available, then in Step 1044, the intermediary system obtains a list of possible return entry IDs based on the taxpayer return and the issued refund amount. For example, the difference between the expected refund amount and the issued refund amount may indicate that the taxpayer return included an inapplicable deduction of a specific type. In Step 1046, this information is used to generate a discrepancy explanation. A discrepancy explanation may include a list of the possible return entry IDs and values used by the issuing authority in calculating the issued refund amount, possible reasons for the issuing authority's actions, and steps the taxpayer can take to avoid the discrepancy in the future.

If in Step 1042, the intermediary system determines that the return entry IDs are available, or if in Step 1040, the discrepancy information records relate to one return entry, then in Step 1048, the intermediary system obtains the return entry IDs. In one or more embodiments of the invention, the return entry IDs may be determined using one or more sections of the discrepancy code or the retrieved discrepancy information records. In one or more embodiments of the invention, the return entry IDs are obtained by generating a query to the issuing authority (directly or via the issuing system) requesting the return entry IDs associated with the taxpayer return. In addition, in one or more embodiments of the invention, the return entry IDs may be determined using the difference between the expected refund amount and the issued refund amount.

In Step 1050, the intermediary system determines whether the return entry value used by the issuing system is available. In one or more embodiment of the invention, the return entry value is available by using one or more sections of the discrepancy code or the retrieved discrepancy information records to determine the return entry value(s). In one or more embodiments of the invention, the return entry value(s) are obtained by generating a query to the issuing authority (directly or via the issuing system) requesting the return entry IDs associated with the taxpayer return.

If the return entry value(s) are not available, then in Step 1052, the return entry value(s) are estimated using the difference between the issued refund amount and the expected refund amount. In Step 1048, this information is included in the generated discrepancy explanation.

If the return entry value(s) are available, then in Step 1054, the intermediary system uses the return entry ID(s) and return entry value(s) to recalculate the expected refund amount. In Step 1056, the intermediary system determines whether the recalculated expected refund amount is equal to the issued refund amount. In one or more embodiments of the invention, the expected refund amount is recalculated by the intermediary system to ensure that the issuing authority and the intermediary system possess consistent information.

If the recalculated expected refund and the issued refund amount are not equal or not within a pre-determined margin, then in Step 1058, the intermediary system files an objection with the issuing authority. In one or more embodiments of the invention, the objection provides the issuing authority with information related to the inconsistency between the recalculated expected refund amount and the issued refund amount. In one or more embodiments of the invention, the objection is submitted via the issuing system. Alternatively, in one or more embodiments of the invention, the intermediary system notifies the taxpayer prior to submitting the objection. In one or more embodiments of the invention, the intermediary system may request authorization from the taxpayer in order to submit the objection, and may not submit the objection without authorization. In one or more embodiments of the invention, the intermediary system provides instructions enabling the taxpayer to file the objection.

If the intermediary system determines that the recalculated expected refund amount is equal to the issued refund amount, or within a pre-determined margin, then in Step 1048, the information related to the recalculated expected refund amount is included in the generated discrepancy explanation.

FIG. 10D shows a flowchart in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel.

FIG. 10D continues from FIG. 10A, and shows the steps taken by the intermediary system if at least one of the discrepancy information records relate to an error in one or more return entries of the taxpayer return, and at least one of the discrepancy information records related to a garnishment.

In Step 1080, the intermediary system obtains any available return entry IDs using any applicable methods described in reference to FIG. 10C. In Step 1082, the intermediary system obtains any available garnishment types using any applicable methods described in reference to FIG. 10B. In Step 1084, the intermediary system obtains any available return entry values using any applicable methods described in reference to FIG. 10C. In Step 1086, the intermediary system obtains any available garnishment amounts using any applicable methods described in reference to FIG. 10B.

In Step 1088, the information obtained regarding the return entry IDs, return entry values, garnishment amounts, and garnishment types is included in a generated discrepancy explanation. In one or more embodiments of the invention, and as described above, the discrepancy explanation is a physical or electronic document or set of documents which may provide the associated taxpayer with information related to a discrepancy between the taxpayer's expected refund amount and the issued refund amount. In addition to the obtained information, the discrepancy explanation may also include any information which the intermediary system is able to determine based on the obtained return entry IDs, return entry values, garnishment amounts, and garnishment types in one or more of the processes described in reference to FIGS. 10B and 10C.

Figure 11A:
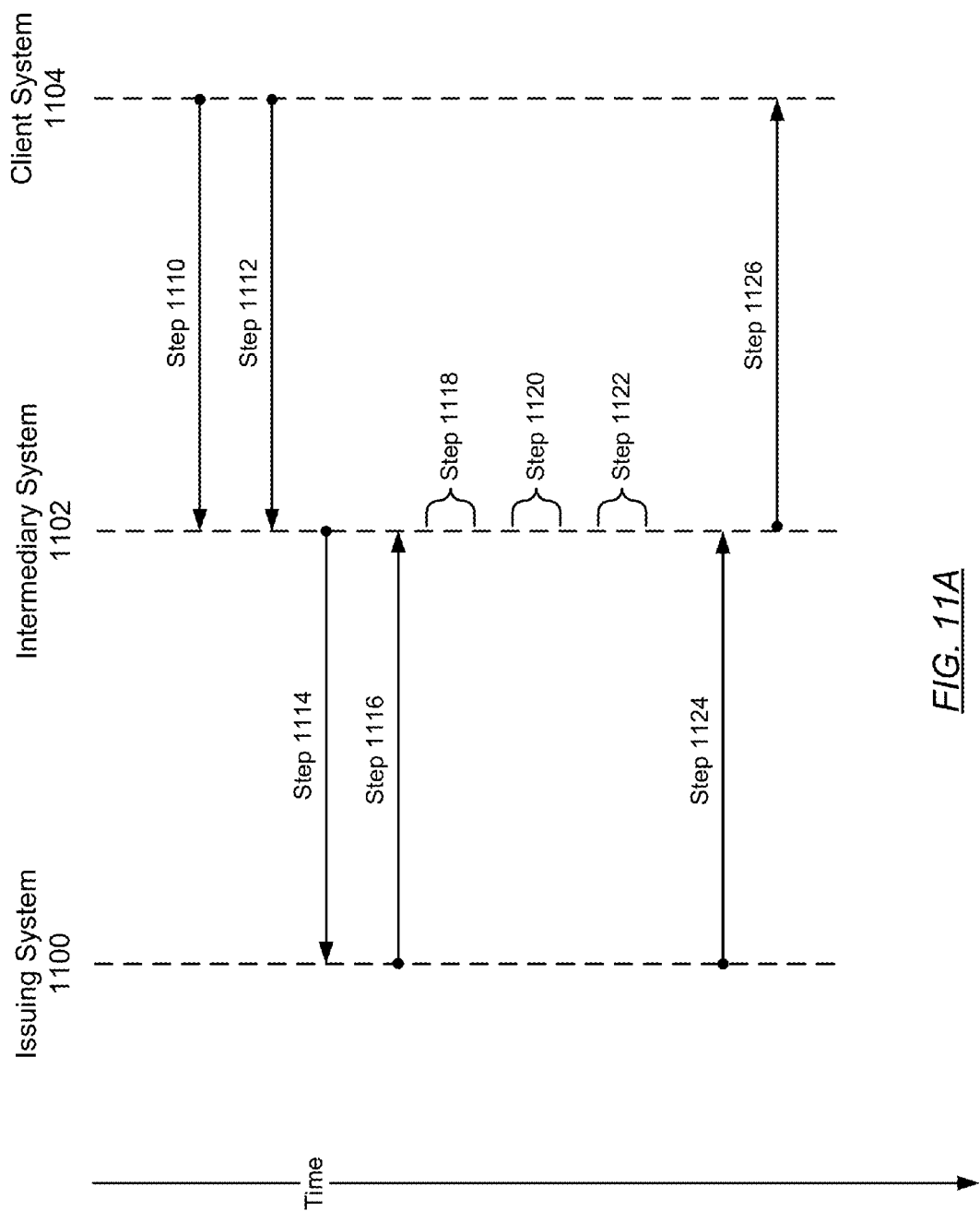
FIGS. 11A-11D show examples in accordance with one or more embodiments of the invention.

FIG. 11A shows an example in accordance with one or more embodiments of the invention. The example shown in FIG. 11A is for explanatory purposes only and not intended to limit the scope of the invention. In the example, consider the scenario in which the client system (1104) utilizes the intermediary system (1102) to generate a federal income tax return, as well as provide a discrepancy explanation in the event that the issued refund amount and the expected refund amount are not equal.

At Step 1110, the client system (1104) (under the control of the taxpayer), sends a request to the intermediary system (1102) initiating the service. At Step 1112, the client system (1104) transmits the tax information associated with the taxpayer and tax year to the intermediary system (1102). In Step 1114, the intermediary system (1102) generates the federal income tax return, and transmits that return to the issuing system (1100) (the IRS electronic filing system) under the control of the IRS (i.e., the issuing authority). By generating the federal income tax return, the intermediary system (1102) also generates an expected refund amount of $2,000.

At Step 1116, the IRS, via the issuing system (1100), sends a refund receipt to the intermediary system (1102). For the purposes of the present example assume that the refund receipt includes the issued refund amount, listed as $1,000, and a single discrepancy code listed as EE-6-0. At Step 1118, the intermediary system uses the information within the refund receipt to determine that a discrepancy exists between the expected refund amount and the issued refund amount retrieved from the refund receipt ($1,000).

At Step 1120, the intermediary authority (1102), using the steps described in FIG. 9, obtains the discrepancy codes from the refund receipt and generates a query to a discrepancy code database using the obtained discrepancy code of EE-6-0. The discrepancy code database returns a discrepancy code record stating that EE-X-Y indicates a return entry error at line X, and that the value of Y is the value used by the IRS in calculating the issued refund amount. For the purposes of the present explanation, assume that line 6 is an education deduction of $1,000 which may be taken if a separate document is filed showing proof of enrollment in an educational facility. Also assume that the separate document was not filed by the taxpayer or the intermediary system (1102).

At Step 1122, using the steps described in FIG. 10C, the intermediary system (1102) uses the discrepancy information record to determine that the discrepancy relates to a single return entry error. The return entry ID (line 6) is obtained using the discrepancy information record and the discrepancy code. The intermediary system (1102) then obtains the return entry value used by the issuing authority ($0). The intermediary system (1102) then recalculates the expected refund amount using the return entry value of $0 at the return entry identified as line 6. Assume that the recalculated expected refund amount is equal to the issued refund amount. At this point, the intermediary system (1102) generates a discrepancy explanation using the information gathered above. The intermediary system may further include instructions on how the taxpayer may file the necessary document to claim the deduction effectively in the future.

At Step 1124, the IRS, via the issuing system (1100) transmits the refund to the intermediary system (1102). At Step 1126, the intermediary system (1102) transmits the generated discrepancy explanation and the refund to the taxpayer via the client system (1104).

Figure 11B:
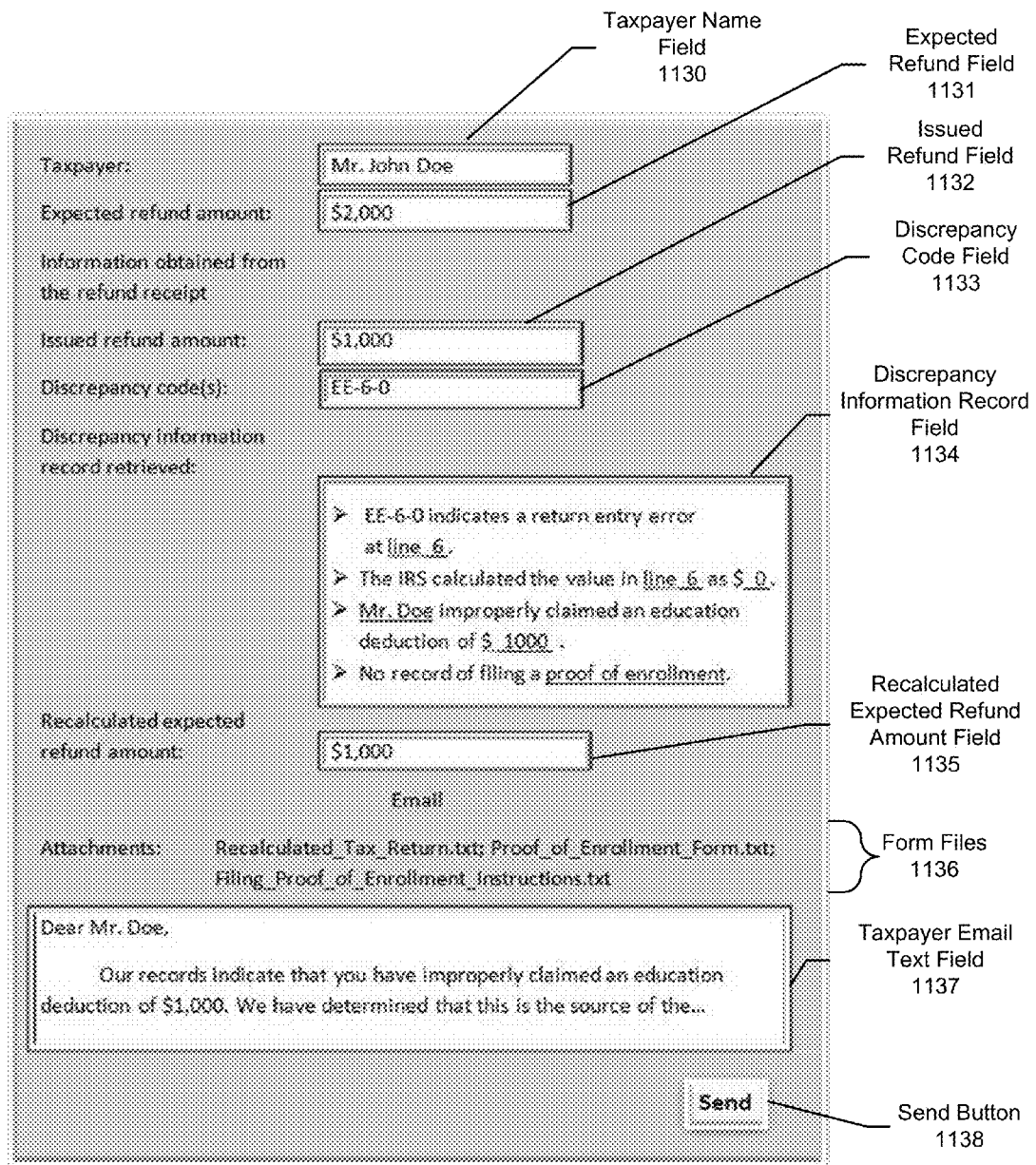

FIG. 11B shows an example screenshot of an interface through with a tax preparer may interact with the intermediary system, using the example information described in reference to FIG. 11B. As shown in FIG. 11B, the display includes a taxpayer name field (1130), an expected refund field (1131), and issued refund field (1132), a discrepancy code field (1133), a discrepancy information record field (1134), and a recalculated expected refund field (1135). The display may further include functionality to send the information to a taxpayer via email using the attached form files (1136), the taxpayer email text field (1137), and the send button (1138). Each field described above may be used to input information gathered by the user of the intermediary system, or to display information based on the information gathered by the intermediary system.

Figure 11C:
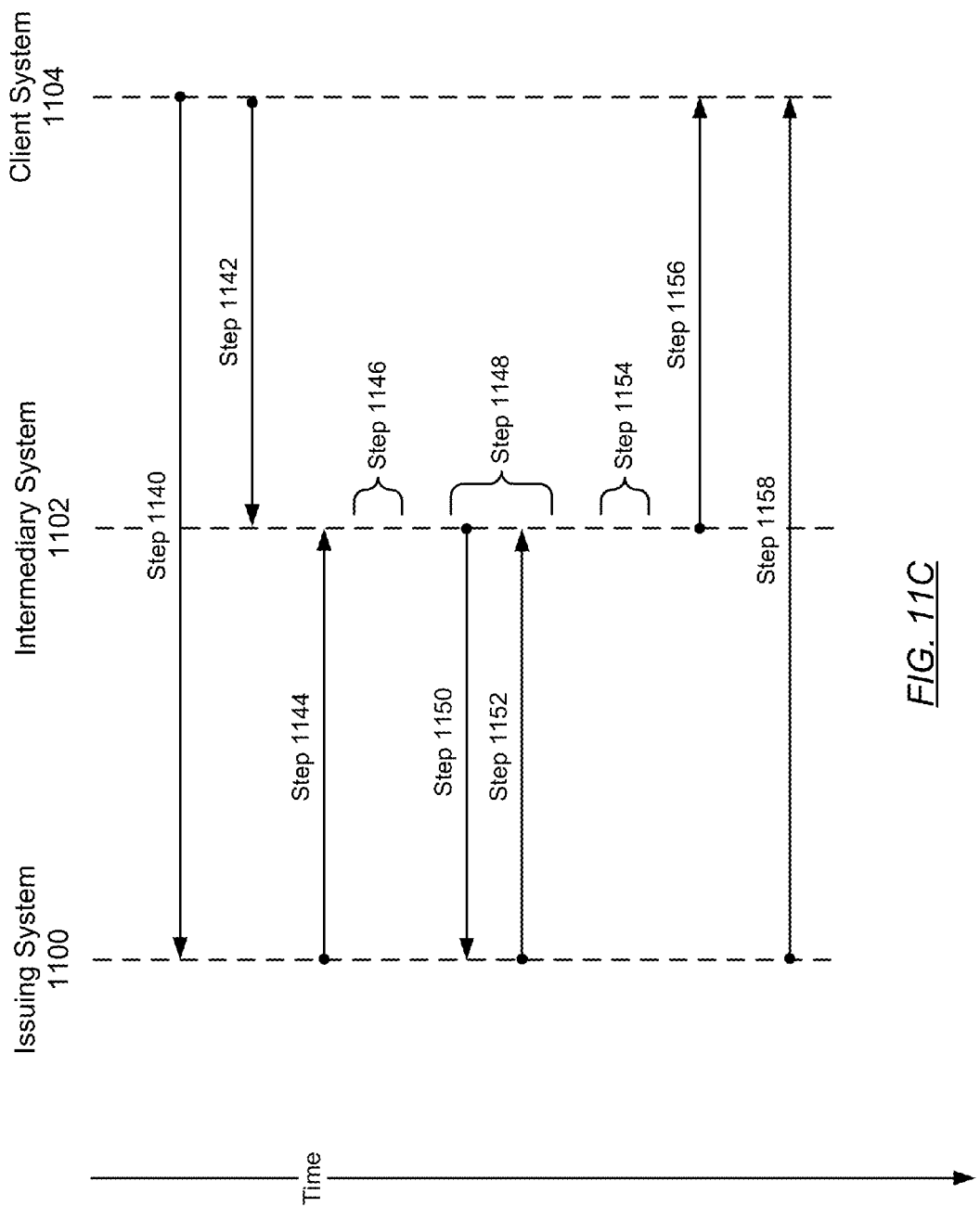

FIG. 11C shows an example in accordance with one or more embodiments of the invention. The example shown in FIG. 11C is for explanatory purposes only and not intended to limit the scope of the invention. In the example, consider the scenario in which the taxpayer, via the client system (1104) generates a federal income tax return, and at Step 1140, transmits the federal income tax return directly to the IRS via the issuing system (1100). At Step 1142, the taxpayer enlists the services provided by the intermediary system (1102), and transmits, to the intermediary system, the federal income tax return submitted to the IRS. Finally, assume that the federal income tax return includes an expected refund amount of $2,000.

At Step 1144, the intermediary system retrieves the refund receipt via an interface provided by the IRS on the issuing system (1100). This interface may provide a refund receipt to an authorized intermediary system (1102) acting on behalf of a taxpayer. For the purposes of the present example, assume that the refund receipt includes only an issued refund amount of $1,000, and no further information. At Step 1146, the intermediary system (1102) detects a discrepancy using the issued refund amount extracted from the refund receipt and the expected refund amount determined using the federal income tax return received from the taxpayer at Step 1142.

At Step 1148, using the steps described in FIG. 9, the intermediary system (1102) determines that the refund receipt includes no discrepancy codes. In Step 1150, the intermediary system (1102) requests the discrepancy codes from the IRS via the issuing system (1100). At Step 1152, the issuing system (1100) provides the discrepancy codes G-BT and G-CS to the intermediary system (1102). The issuing authority (1102) generates a query to a discrepancy code database using the obtained discrepancy codes G-BT and G-CS. The discrepancy code database returns a discrepancy code record stating that the discrepancy code G-BT indicates a garnishment due to unpaid back taxes, and that the discrepancy code G-CS indicates garnishment due to unpaid child support.

At Step 1154, using the steps described in FIGS. 10A and 10B, the intermediary system (1102) determines that the discrepancy information records indicate no return entry errors, and more than one garnishment type. The intermediary system (1102) then determines that the garnishment amounts have not been provided and are not available. However, the intermediary system (1102) has obtained the garnishment types, and uses the obtained garnishment types and discrepancy amount to generate a list of possible garnishment amounts. For the purposes of the present example, this may include a scenario in which the maximum amount allowable has been withheld for unpaid child support, and the garnishment from unpaid taxes is calculated as the difference between this amount and the amount of the discrepancy. The intermediary system (1102) then generates a discrepancy explanation using the information gathered above, as well as instructions on how the taxpayer may file an objection to the garnishments or mitigate the impact of the garnishments in future income tax returns.

At Step 1156, the intermediary system (1102) transmits the generated discrepancy explanation to the taxpayer via the client system (1104). At Step 1158, the IRS, via the issuing system (1100), transmits the refund directly to the client system (1104).

Figure 11D:
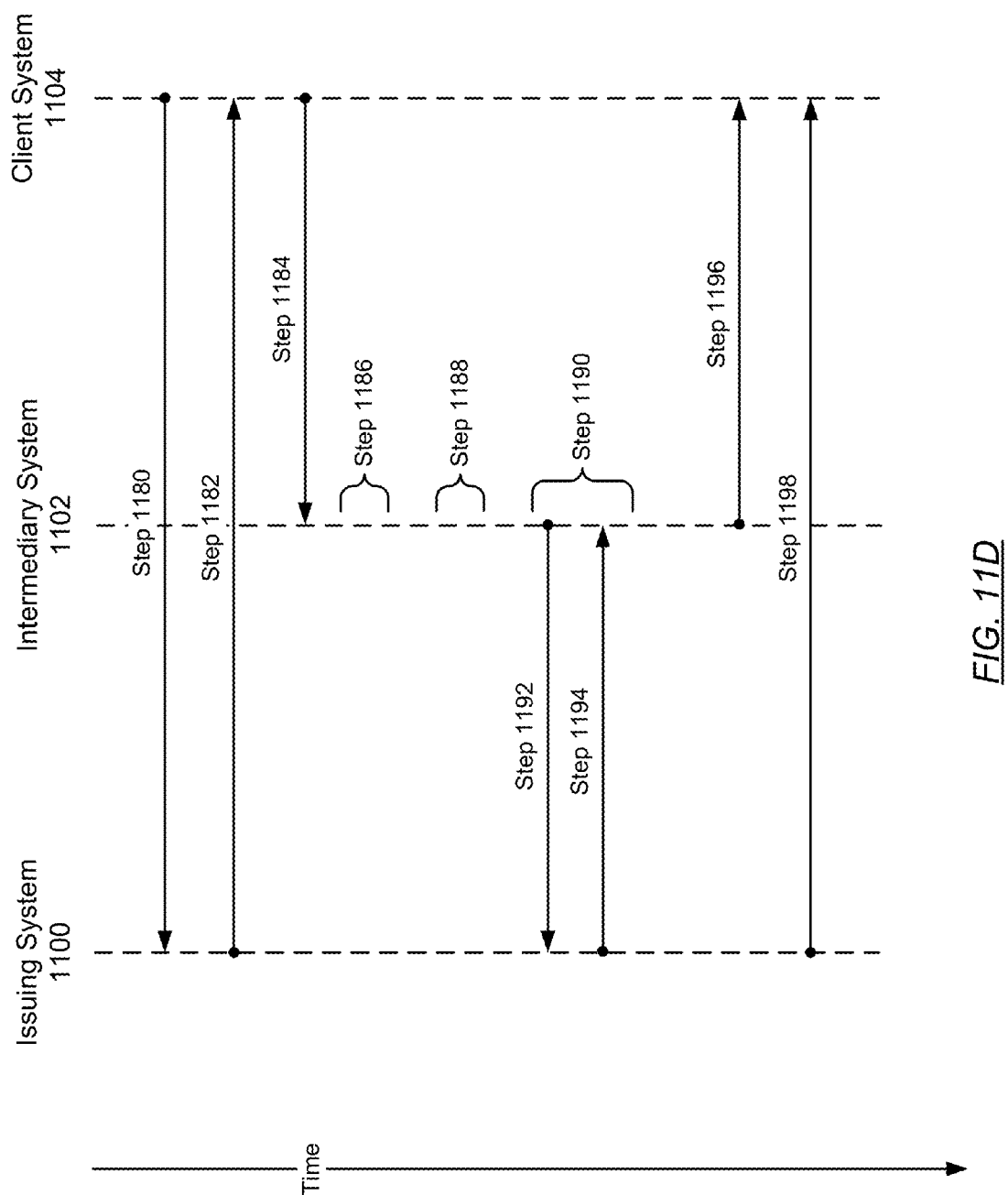

FIG. 11D shows an example in accordance with one or more embodiments of the invention. The example shown in FIG. 11D is for explanatory purposes only and not intended to limit the scope of the invention. In the example, consider the scenario in which the taxpayer initiates the service after directly filing a federal income tax return with the IRS, via the issuing system (1100), and receiving a refund receipt.

At Step 1180, the taxpayer, via the client system (1104) transmits a federal income tax return directly to the IRS via the issuing system (1100). In Step 1182, the taxpayer retrieves a refund receipt via an interface provided by the IRS on the issuing system (1100). At Step 1184, the taxpayer, via the client system (1104) enlists the services provided by the intermediary system (1102), and transmits, to the intermediary system, the federal income tax return submitted to the IRS as well as the refund receipt. Finally, assume that the federal income tax return includes an expected refund amount of $2,000.

At Step 1186, using the steps described in FIG. 9, the intermediary system (1102) obtains the discrepancy codes G-1993 and EE-0000 from the refund receipt received from the client system (1104). At Step 1188, the intermediary system (1102) generates a query to a discrepancy code database using the obtained discrepancy codes. The query response indicates that the discrepancy code G-Z indicates unpaid income taxes from year Z, and that the discrepancy code EE-0000 indicates only that the issuing authority believes the expected refund amount was calculated incorrectly.

At Step 1190, using the steps described in FIG. 10D, the intermediary system (1102) obtains the available information from the federal income tax return filed by the taxpayer in the year 1993. The intermediary system (1102) may also review the federal income tax return submitted by the taxpayer for the previous year to determine the source of the miscalculated expected refund amount.

During Step 1190, the intermediary system (1102) communicates with the issuing system (1100) to attempt to gather further information. At Step 1192, the intermediary system (1102) submits a request to the issuing authority, via the issuing system (1100), for further information related to the discrepancy. At Step 1194, the intermediary system (1102) receives a response indicating that no further information is available. This information and response, combined with generally applicable tax advice related to unpaid back taxes and incorrect calculations, is then used to generate a discrepancy explanation.

At Step 1196, the intermediary system (1102) transmits the generated discrepancy explanation and the refund to the taxpayer via the client system (1104). Finally, at Step 1198, the IRS, via the issuing system (1100) transmits the refund to the intermediary system (1102).

Figure 12:
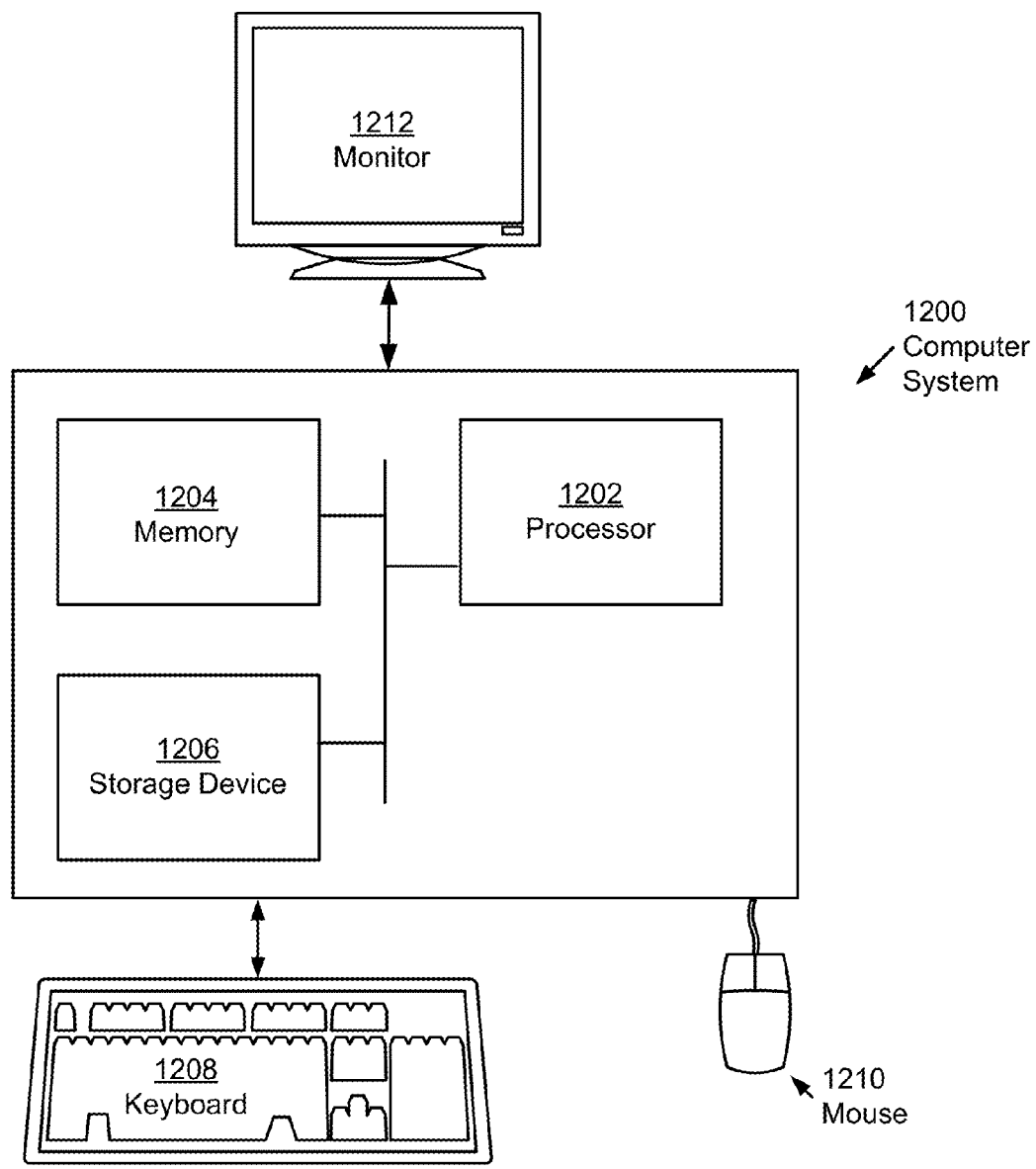
FIG. 12 shows a computer system in accordance with one or more embodiments of the invention.

Embodiments of the invention may be implemented on virtually any type of computer regardless of the platform being used. For example, as shown in FIG. 12, a computer system (1200) includes one or more processor(s) (1202) such as a central processing unit (CPU) or other hardware processor(s), associated memory (1204) (e.g., random access memory (RAM), cache memory, flash memory, etc.), a storage device (1206) (e.g., a hard disk, an optical drive such as a compact disk drive or digital video disk (DVD) drive, a flash memory stick, etc.), and numerous other elements and functionalities typical of today's computers (not shown). In one or more embodiments of the invention, the processor (1202) is hardware. For example, the processor may be an integrated circuit. The computer system (1200) may also include input means, such as a keyboard (1208), a mouse (1210), or a microphone (not shown). Further, the computer system (1200) may include output means, such as a monitor (1212) (e.g., a liquid crystal display (LCD), a plasma display, or cathode ray tube (CRT) monitor). The computer system (1200) may be connected to a network (1214) (e.g., a local area network (LAN), a wide area network (WAN) such as the Internet, or any other type of network) via a network interface connection (not shown). Those skilled in the art will appreciate that many different types of computer systems exist, and the aforementioned input and output means may take other forms. Generally speaking, the computer system (1200) includes at least the minimal processing, input, and/or output means necessary to practice embodiments of the invention.

Further, those skilled in the art will appreciate that one or more elements of the aforementioned computer system (1200) may be located at a remote location and connected to the other elements over a network. Further, embodiments of the invention may be implemented on a distributed system having a plurality of nodes, where each portion of the invention (e.g., user agreement information, product use agreement pre-recordings, application store, product use agreement application, etc.) may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources. Further, software instructions in the form of computer readable program code to perform embodiments of the invention may be stored, temporarily or permanently, on a non-transitory computer readable storage medium, such as a compact disc (CD), a diskette, a tape, memory, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for interpreting discrepancy codes comprising:
   obtaining, by an intermediary system, tax information associated with a taxpayer, wherein the tax information comprises an expected refund amount;
   obtaining an issued refund amount associated with the taxpayer;
   comparing the expected refund amount and the issued refund amount;
   determining, based on the comparing, a discrepancy amount;
   obtaining, in response to determining the discrepancy amount, a discrepancy code associated with the issued refund amount;
   retrieving, from a discrepancy code database, a discrepancy information record using the discrepancy code, wherein the discrepancy information record indicates that a source of the discrepancy amount is a data entry error;
   generating a discrepancy explanation using the discrepancy information record, the discrepancy amount, and the tax information, wherein generating the discrepancy explanation comprises:
      extracting, from the discrepancy code, a return entry identifier of the data entry error;
      determining a return entry value of the data entry error using the return entry identifier; and
      generating the discrepancy explanation using the return entry identifier and the return entry value, wherein the discrepancy explanation comprises a reason for an issuing authority to issue the issued refund amount; and sending the generated discrepancy explanation to a client system.

2. The method of claim 1,
wherein obtaining, by the intermediary system, tax information associated with the taxpayer comprises:
generating the tax information using input received from the taxpayer, wherein the tax information comprises a tax return; and
sending, to an issuing system, the tax return.

3. The method of claim 1,
wherein tax information comprises a tax return, and
wherein obtaining the issued refund amount associated with the taxpayer comprises:
sending, to an issuing system, an issued refund amount request; and
receiving, from the issuing system, the issue refund amount.

4. The method of claim 1,
wherein tax information comprises a tax return and the issued refund amount, and
wherein obtaining the issued refund amount associated with the taxpayer comprises retrieving the issued refund amount from the tax information.

5. The method of claim 1, wherein the expected refund amount is a dollar value of a federal income tax refund calculated by a tax return preparer.

6. The method of claim 1, wherein the issued refund amount is a dollar value of a federal income tax refund calculated by an issuing authority.

7. The method of claim 1, wherein the discrepancy code comprises at least one selected from a group consisting of numeric characters and alphabetic characters.

8. The method of claim 1, wherein retrieving, from the discrepancy code database, the discrepancy information record using the discrepancy code comprises searching the discrepancy code database using the discrepancy code to obtain database entries associated with the discrepancy code.

9. A method for interpreting discrepancy codes comprising:
obtaining, by a client system, an issued refund amount and a discrepancy code from an issuing system, wherein the issued refund amount is associated with a taxpayer;
comparing, by the client system, the issued refund amount and an expected refund amount, wherein the expected refund amount is determined using a tax return associated with the taxpayer;
determining, based on the comparing, a discrepancy amount;
retrieving, from a discrepancy code database based on the determination, a discrepancy information record using the discrepancy code, wherein the discrepancy information record indicates that a source of the discrepancy amount is a data entry error; and
generating a discrepancy explanation using the discrepancy information record, the discrepancy amount, and the tax information, wherein generating the discrepancy explanation comprises:
extracting, from the discrepancy code, a return entry identifier of the data entry error;
determining a return entry value of the data entry error using the return entry identifier; and
generating the discrepancy explanation using the return entry identifier and the return entry value,
wherein the discrepancy explanation comprises a reason for an issuing authority to issue the issued refund amount.

10. The method of claim 9, wherein the discrepancy code database is located on one selected from a group consisting of the client system and an intermediary system.

11. The method of claim 9, wherein the client system is an application executing on a processor of a computer system operated by the taxpayer.

12. A non-transitory computer readable storage medium comprising software instructions, which when executed by a processor, perform a method, the method comprising:
obtaining, by an intermediary system, tax information associated with a taxpayer, wherein the tax information comprises an expected refund amount;
obtaining an issued refund amount associated with the taxpayer;
comparing the expected refund amount and the issued refund amount;
determining, based on the comparing, a discrepancy amount;
obtaining, in response to determining the discrepancy amount, a discrepancy code associated with the issued refund amount;
retrieving, from a discrepancy code database, a discrepancy information record using the discrepancy code, wherein the discrepancy information record indicates that a source of the discrepancy amount is a data entry error;
generating a discrepancy explanation using the discrepancy information record, the discrepancy amount, and the tax information, wherein generating the discrepancy explanation comprises:
extracting, from the discrepancy code, a return entry identifier of the data entry error;
determining a return entry value of the data entry error using the return entry identifier; and
generating the discrepancy explanation using the return entry identifier and the return entry value,
wherein the discrepancy explanation comprises a reason for an issuing authority to issue the issued refund amount; and
sending the generated discrepancy explanation to the client system.

13. The non-transitory computer readable storage medium of claim 12, wherein obtaining, by the intermediary system, tax information associated with the taxpayer comprises:
generating the tax information using input received from the taxpayer, wherein the tax information comprises a tax return; and
sending, to an issuing system, the tax return.

14. The non-transitory computer readable storage medium of claim 12, wherein tax information comprises a tax return, and
wherein obtaining the issued refund amount associated with the taxpayer comprises:
sending, to an issuing system, an issued refund amount request; and
receiving, from the issuing system, the issue refund amount.

15. The non-transitory computer readable storage medium of claim 12, wherein tax information comprises a tax return and the issued refund amount, and
wherein obtaining the issued refund amount associated with the taxpayer comprises retrieving the issued refund amount from the tax information.

16. The non-transitory computer readable storage medium of claim 12, wherein the expected refund amount is a dollar value of a federal income tax refund calculated by a tax return preparer.

17. The non-transitory computer readable storage medium of claim 12, wherein the issued refund amount is a dollar value of a federal income tax refund calculated by an issuing authority.

18. The non-transitory computer readable storage medium of claim 12, wherein the discrepancy code comprises at least one selected from a group consisting of numeric characters and alphabetic characters.

19. The non-transitory computer readable storage medium of claim 12, wherein retrieving, from the discrepancy code database, the discrepancy information record using the discrepancy code comprises searching the discrepancy code database using the discrepancy code to obtain database entries associated with the discrepancy code.

20. A non-transitory computer readable storage medium comprising software instructions, which when executed by a processor, perform a method, the method comprising:
  obtaining, by a client system, an issued refund amount and a discrepancy code from an issuing system, wherein the issued refund amount is associated with a taxpayer;
  comparing, by the client system, the issued refund amount and an expected refund amount, wherein the expected refund amount is determined using a tax return associated with the taxpayer;
  determining, based on the comparing, a discrepancy amount;
  retrieving, from a discrepancy code database, a discrepancy information record using the discrepancy code, wherein the discrepancy information record indicates that a source of the discrepancy amount is a data entry error; and
  generating a discrepancy explanation using the discrepancy information record, the discrepancy amount, and the tax information, wherein generating the discrepancy explanation comprises:
    extracting, from the discrepancy code, a return entry identifier of the data entry error;
    determining a return entry value of the data entry error using the return entry identifier; and
    generating the discrepancy explanation using the return entry identifier and the return entry value,
    wherein the discrepancy explanation comprises a reason for an issuing authority to issue the issued refund amount.

21. The non-transitory computer readable storage medium of claim 20, wherein the discrepancy code database is located on one selected from a group consisting of the client system and an intermediary system.

22. The non-transitory computer readable storage medium of claim 20, wherein the client system is an application executing on the processor of a computer system operated by the taxpayer.

23. A system comprising:
  an intermediary system comprising:
    a discrepancy code database, and
    a tax return associated with the taxpayer, wherein the tax return comprises an expected refund amount; and
  an application executing on a processor and configured to:
    retrieve, from an issuing system, an issued refund amount associated with a taxpayer,
    compare the expected refund amount and the issued refund amount,
    determine, based on the comparing, a discrepancy amount,
    obtain, in response to determining the discrepancy amount, a discrepancy code associated with the issued refund amount,
    retrieve, from the discrepancy code database, a discrepancy information record using the discrepancy code, wherein the discrepancy information record indicates a source of the discrepancy amount as a data entry error,
    generate a discrepancy explanation using the discrepancy information record, the discrepancy amount, and the tax return, wherein generating the discrepancy explanation comprises:
      extracting, from the discrepancy code, a return entry identifier of the data entry error;
      determining a return entry value of the data entry error using the return entry identifier; and
      generating the discrepancy explanation using the return entry identifier and the return entry value,
      wherein the discrepancy explanation comprises a reason for an issuing authority to issue the issued refund amount, and
    send the generated discrepancy explanation to a client system.

24. The system of claim 23, wherein the intermediary system is one selected from a group consisting of a computer system operated by the taxpayer and a web server communicating with a computer operated by the taxpayer.

25. The system of claim 23, further comprising:
  an issuing system operated by an issuing authority and configured to:
    receive an issued refund amount request, wherein the issued refund amount request comprises a taxpayer identifier; and
  send, in response to the receiving, the issued refund amount and the discrepancy code.

* * * * *